United States Patent
Hua

(10) Patent No.: US 11,282,080 B2
(45) Date of Patent: *Mar. 22, 2022

(54) ELECTRONIC PAYMENT SERVICE PROCESSING

(71) Applicant: Advanced New Technologies Co., Ltd., George Town (KY)

(72) Inventor: Chenming Hua, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,622

(22) Filed: Dec. 19, 2019

(65) Prior Publication Data

US 2020/0126077 A1  Apr. 23, 2020

Related U.S. Application Data

(63) Continuation of application No. 16/054,577, filed on Aug. 3, 2018, which is a continuation of application No. PCT/CN2017/072144, filed on Jan. 23, 2017.

(30) Foreign Application Priority Data

Feb. 4, 2016 (CN) .......................... 201610079893.2

(51) Int. Cl.
G06Q 20/40 (2012.01)
G06Q 20/32 (2012.01)
G06Q 20/38 (2012.01)

(52) U.S. Cl.
CPC ......... *G06Q 20/401* (2013.01); *G06Q 20/322* (2013.01); *G06Q 20/3278* (2013.01); *G06Q 20/38215* (2013.01); *G06Q 20/40* (2013.01)

(58) Field of Classification Search
CPC ............... G06Q 20/401; G06Q 20/322; G06Q 20/3278; G06Q 20/38215; G06Q 20/40
(Continued)

(56) References Cited

U.S. PATENT DOCUMENTS 7,788,185 B2   8/2010 Kashiwada
8,099,077 B2 * 1/2012 Chowdhury ........... G06Q 20/12
                                                            455/406

(Continued)

FOREIGN PATENT DOCUMENTS

CN    101079132 A  * 11/2007
CN    103106580       5/2013

(Continued)

OTHER PUBLICATIONS

Visa, Visa Brings Token Security to eCommerce, 2015, Business Wire. (Year: 2015).*

Primary Examiner — Hani M Kazimi
Assistant Examiner — Alison L. Lamb
(74) Attorney, Agent, or Firm — Fish & Richardson P.C.

(57) ABSTRACT

Implementations of electronic payment service processing methods and devices are disclosed. In an implementation, a server receives a first information set for performing an electronic payment, where the first information set includes payment information of a first payment option and service information for performing the electronic payment. The server may determine that the electronic payment has not been successfully performed. In response to determining that the electronic payment has not been successfully performed, a one-click payment link associated with payment information of a second payment option and the service information is generated, and the one-click payment link is provided to a mobile computing device.

21 Claims, 13 Drawing Sheets

(58) Field of Classification Search
USPC .......................................................... 705/44
See application file for complete search history.

(56) References Cited

U.S. PATENT DOCUMENTS

| | | | |
|---|---|---|---|
| 9,218,476 B1 * | 12/2015 | Roth | ................... H04L 63/0838 |
| 10,250,594 B2 * | 4/2019 | Chathoth | ............ H04L 63/0838 |
| 2002/0103753 A1 | 8/2002 | Schimmel | |
| 2012/0197807 A1 | 8/2012 | Schlesser et al. | |
| 2013/0024371 A1 | 1/2013 | Hariramani et al. | |
| 2015/0100443 A1 | 4/2015 | Van Heerden et al. | |
| 2015/0161585 A1 | 6/2015 | Huster | |
| 2018/0341947 A1 | 11/2018 | Hua | |

FOREIGN PATENT DOCUMENTS

| | | | |
|---|---|---|---|
| CN | 103106580 A | * | 5/2013 |
| CN | 103198405 | | 7/2013 |
| CN | 103198405 A | * | 7/2013 |
| CN | 103927658 | | 7/2014 |
| CN | 104463583 | | 3/2015 |
| CN | 104766202 | | 7/2015 |
| JP | 2001155107 | | 6/2001 |
| JP | 2002288574 | | 10/2002 |
| JP | 2002329153 | | 11/2002 |
| JP | 2004005425 | | 1/2004 |
| JP | 2005165530 | | 6/2005 |
| JP | 5542312 | | 7/2014 |
| WO | WO 2016004813 | | 1/2016 |

* cited by examiner

ELECTRONIC PAYMENT SERVICE PROCESSING

CROSS REFERENCE TO RELATED APPLICATIONS

This application is a continuation of U.S. patent application Ser. No. 16/054,577, filed on Aug. 3, 2018, which is a continuation of PCT Application No. PCT/CN2017/072144, filed on Jan. 23, 2017, which claims priority to Chinese Patent Application No. 201610079893.2, filed on Feb. 4, 2016, and each application is hereby incorporated by reference in its entirety.

TECHNICAL FIELD

The present application relates to the field of computer information technologies, and in particular, to an electronic payment service processing method and device, and an electronic payment method and device.

BACKGROUND

With the rapid development of the Internet, users use remote computer technologies to process services more frequently in their daily lives. When processing services by using the remote computer technologies, users send service processing instructions by using electronic terminals such as a computer, a mobile phone, and a web television set, and process the services by using remote servers. A service processing procedure can be as follows: A user sends a service processing request, submits necessary information for service processing, and receives a service processing result from a server. The necessary information for service processing usually includes service processing channel information, service processing-related protocol agreement information, service processing authentication information, etc. Service processing may fail due to errors in the service processing procedure. The errors may be caused by the incorrect submitted necessary information for service processing or external factors such as the server.

In the existing technology, for example, when an electronic payment service fails to be processed, a server feeds back a failure prompt page to the user. The failure prompt page includes failure type prompt information and an entrance for re-processing the electronic payment service. The user needs to enter, through the fed-back entrance, an electronic payment service processing page, and then resubmits necessary information for electronic payment service processing based on the failure type prompt information, to re-process the service.

It can be seen that, in the existing technology, when the electronic payment service fails to be processed, the failure type prompt information and the entrance for re-processing the electronic payment service are fed back to the user, and then the user resubmits the necessary information for electronic payment service processing through the fed-back entrance, to re-process the electronic payment service. However, in such a method, the user needs to resubmit all necessary information for electronic payment service processing. Many operations need to be performed to re-process the electronic payment service, and as a result, user experience is poor during electronic payment service processing.

SUMMARY

Implementations of the present application provide an electronic payment service processing method and device, and an electronic payment method and device, to resolve a problem in the existing technology that leads to poor user experience during electronic payment service processing. The problem is when electronic payment service processing fails, many operations are needed to perform the electronic payment service processing by using a returned entrance.

An implementation of the present application provides an electronic payment service processing method, and the method includes: receiving, by a server, a first service information set needed for electronic payment service processing, to perform the electronic payment service processing; determining, by the server, whether the electronic payment service processing fails, and if yes, determining, based on a type of the electronic payment service processing failure, whether to generate a re-payment entrance, where the re-payment entrance can be associated with a second service information set; the second service information set is formed after a corresponding element in the first service information set that causes the electronic payment service processing failure is adjusted; and after generating the re-payment entrance and receiving an instruction indicating that the re-payment entrance is triggered, performing, by the server, the electronic payment service processing by using elements in the second service information set and a third service information set, where the third service information set is a difference set of the first service information set and the second service information set.

Preferably, the method further includes: establishing, by the server, a mapping relationship between the re-payment entrance and the third service information set; and obtaining, by the server, the third service information set based on the mapping relationship when receiving the instruction indicating that the re-payment entrance is triggered.

Preferably, the establishing, by the server, a mapping relationship between the re-payment entrance and the third service information set includes: generating, by the server, a unique identifier while or after generating the re-payment entrance; establishing, by the server, a mapping relationship between the unique identifier and the third service information set, and a mapping relationship between the re-payment entrance and the unique identifier; and the obtaining, by the server, the third service information set based on the mapping relationship when receiving the instruction indicating that the re-payment entrance is triggered includes: when receiving the instruction indicating that the re-payment entrance is triggered, obtaining the unique identifier based on the mapping relationship between the re-payment entrance and the unique identifier, and obtaining the third service information set based on the unique identifier.

Preferably, there is a mapping relationship between the unique identifier and a timestamp, the timestamp is used to record time when the unique identifier is generated; obtaining the unique identifier based on the mapping relationship between the re-payment entrance and the unique identifier, and obtaining the third service information set based on the unique identifier includes: obtaining the timestamp based on the unique identifier after obtaining the unique identifier; determining whether a difference between current time and the time recorded by the timestamp is less than a predetermined time threshold; if yes, obtaining the third service information set based on the unique identifier.

Preferably, there is also a mapping relationship between the unique identifier and status information, the status information is used to record whether the third service information set has been obtained based on the unique identifier; obtaining the unique identifier based on the mapping relationship between the re-payment entrance and the unique identifier, and obtaining the third service information set based on the unique identifier includes: obtaining the status information based on the unique identifier after obtaining the unique identifier; determining, based on the status information, whether the third service information set has been obtained based on the unique identifier; if no, obtaining the third service information set based on the unique identifier.

Preferably, the determining, by the server based on a type of the electronic payment service processing failure, whether to generate a re-payment entrance includes: determining, by the server, whether the type of the electronic payment service processing failure is incorrect electronic payment authentication information; if no, generating the re-payment entrance.

Preferably, when determining whether the electronic payment service processing fails, the method further includes: if no, sending information indicating that the service processing succeeds; or when determining, based on the type of the electronic payment service processing failure, whether to generate the re-payment entrance, if it is determined not to generate the re-payment entrance, the method further includes: sending prompt information corresponding to the type of the electronic payment service processing failure; or when determining whether the type of the electronic payment service processing failure is incorrect electronic payment authentication information, the method further includes: ending the electronic payment service processing, and sending prompt information corresponding to the type of the electronic payment service processing failure.

An implementation of the present application further provides a service processing method, and the method includes: submitting, by a client, a first service information set needed for electronic payment service processing, so that a server performs the electronic payment service processing; and triggering, by the client, a re-payment entrance when the electronic payment service processing fails, so that the server performs the electronic payment service processing by using elements in a second service information set and a third service information set, where the re-payment entrance is generated by the server based on a type of the electronic payment service processing failure and can be associated with the second service information set. The second service information set is formed after the server adjusts a corresponding element in the first service information set that causes the electronic payment service processing failure, and the third service information set is a difference set of the first service information set and the second service information set.

Preferably, the triggering a re-payment entrance includes: clicking a web page hyperlink corresponding to the re-payment entrance; and/or tapping a touchscreen button corresponding to the re-payment entrance; and/or triggering the re-payment entrance through shaking, gesture recognition, or expression recognition.

An implementation of the present application further provides an electronic payment method, and the method includes: receiving a payment element information set needed for electronic payment, to perform the electronic payment; determining whether the electronic payment fails, and if yes, determining, based on a type of the electronic payment failure, whether to generate a re-payment entrance, where the re-payment entrance can be associated with a new payment element formed after a payment element that causes the electronic payment failure is adjusted; and after generating the re-payment entrance and receiving an instruction indicating that the re-payment entrance is triggered, implementing re-payment by using the new payment element and an element in the payment element information set other than the payment element that causes the electronic payment failure.

Preferably, the determining, based on a type of the electronic payment failure, whether to generate a re-payment entrance includes: if the electronic payment fails due to insufficient balance in a payment channel, generating a re-payment entrance that can be associated with a payment channel with sufficient balance, where in this case, the implementing, after receiving an instruction indicating that the re-payment entrance is triggered, re-payment by using the new payment element and an element in the payment element information set other than the payment element that causes the electronic payment failure includes: after receiving the instruction indicating that the re-payment entrance is triggered, implementing re-payment by using the payment channel with sufficient balance and an element in the payment element information set other than the payment channel; and/or if the electronic payment fails because a payment channel is busy with services, generating a re-payment entrance that can be associated with a payment channel that is idle with services, where in this case, the implementing, after receiving an instruction indicating that the re-payment entrance is triggered, re-payment by using the new payment element and an element in the payment element information set other than the payment element that causes the electronic payment failure includes: after receiving the instruction indicating that the re-payment entrance is triggered, implementing re-payment by using the idle payment channel and an element in the payment element information set other than the busy payment channel.

An implementation of the present application further provides a service processing device, and the device includes a first receiving unit, a first judging unit, a first determining unit, a second receiving unit, and a first processing unit.

The first receiving unit is configured to receive a first service information set needed for electronic payment service processing, to perform the electronic payment service processing; the first judging unit is configured to determine whether the electronic payment service processing fails, and if yes, trigger the first determining unit; the first determining unit is configured to: when the electronic payment service processing fails, determine, based on a type of the electronic payment service processing failure, whether to generate a re-payment entrance, where the re-payment entrance can be associated with a second service information set, and the second service information set is formed after a corresponding element in the first service information set that causes the electronic payment service processing failure is adjusted; the second receiving unit is configured to receive an instruction indicating that the re-payment entrance is triggered; and the first processing unit is configured to perform the electronic payment service processing by using elements in the second service information set and a third service information set, where the third service information set is a difference set of the first service information set and the second service information set.

An implementation of the present application further provides an electronic payment service processing device, and the device includes a submitting unit and a triggering unit.

The submitting unit is configured to submit a first service information set needed for electronic payment service processing, so that the electronic payment service processing is performed; and the triggering unit is configured to trigger a re-payment entrance when the electronic payment service processing fails, so that a server performs the electronic payment service processing by using elements in a second service information set and a third service information set, where the re-payment entrance is generated by the server based on a type of the electronic payment service processing failure and can be associated with the second service information set, the second service information set is formed after the server adjusts a corresponding element in the first service information set that causes the electronic payment service processing failure; and the third service information set is a difference set of the first service information set and the second service information set.

An implementation of the present application further provides an electronic payment device, and the device includes a third receiving unit, a second judging unit, a second determining unit, a fourth receiving unit, and a second processing unit.

The third receiving unit is configured to receive a payment element information set needed for electronic payment, to perform the electronic payment; the second judging unit is configured to determine whether the electronic payment fails, and if yes, trigger the second determining unit; the second determining unit is configured to determine, based on a type of the electronic payment failure, whether to generate a re-payment entrance, where the re-payment entrance can be associated with a new payment element formed after a payment element that causes the electronic payment failure is adjusted; the fourth receiving unit is configured to receive an instruction indicating that the re-payment entrance is triggered; and the second processing unit is configured to implement re-payment by using the new payment element and an element in the payment element information set other than the payment element that causes the electronic payment failure. The at least one technical solution used in the implementations of the present application can achieve the following beneficial effects:

A user of the present disclosure submits the first service information set to perform electronic payment service processing. When the electronic payment service processing performed based on the first service information set fails, the server can generate the re-payment entrance based on the type of the service processing failure; receive the second service information set submitted by the user through the re-payment entrance, where the second service information set is formed after the corresponding element in the first service information set that causes the electronic payment service processing failure is adjusted; and perform the electronic payment service processing by using the elements in the second service information set and the third service information set, where the third service information set is the difference set of the first service information set and the second service information set. Therefore, the following problem in the existing technology is resolved: When electronic payment service processing fails, before the electronic payment service processing is performed again, the user needs to resubmit all service information needed for the electronic payment service processing. As such, user experience is improved.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF EMBODIMENTS

To make the objectives, technical solutions, and advantages of the present application clearer, the following clearly and completely describes the technical solutions of the present application with reference to the implementations of the present application and corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present invention are described in detail below with reference to the accompanying drawings.

Implementation 1

Figure 1:
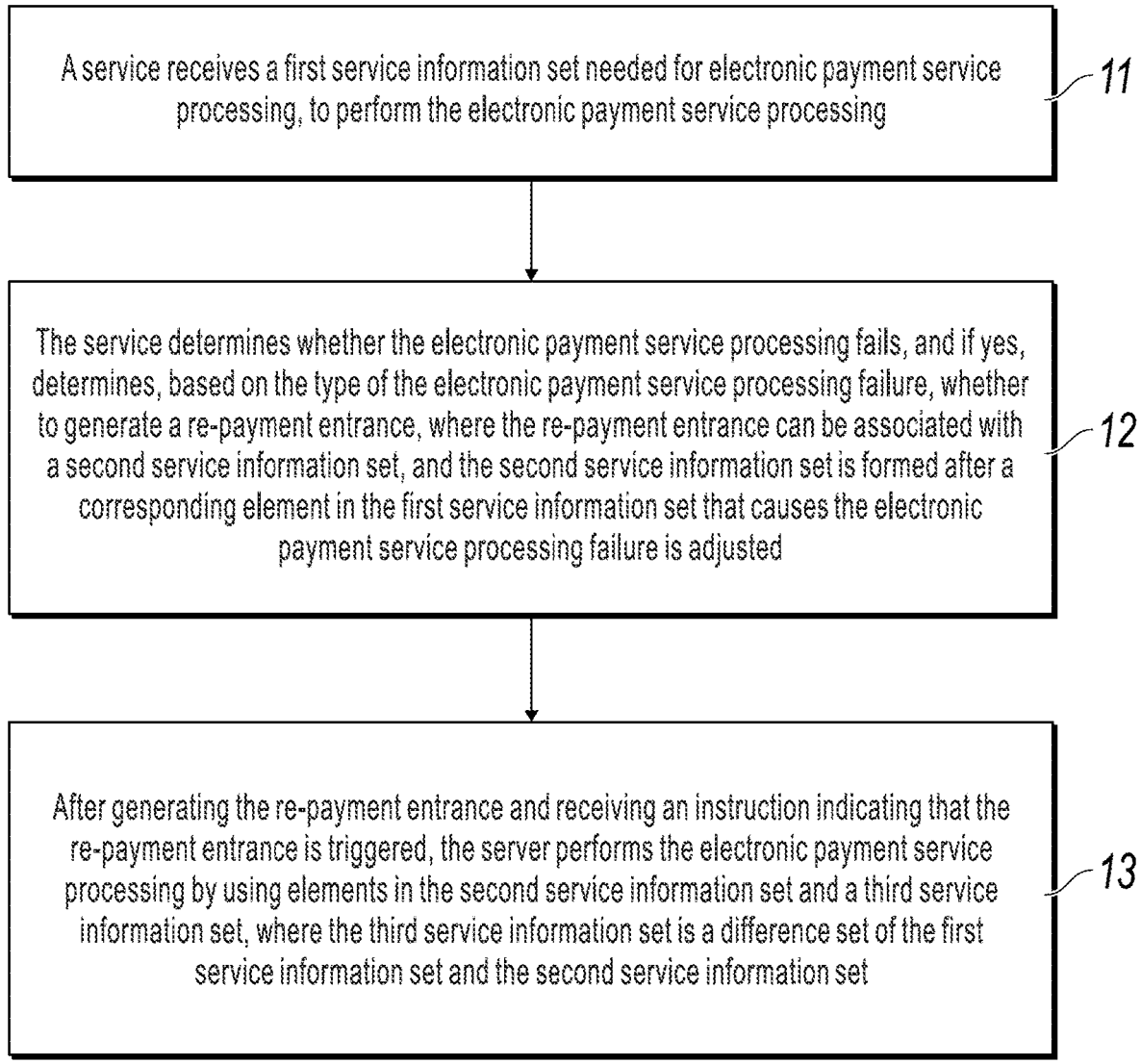
FIG. 1 is a schematic flowchart illustrating implementation of an electronic payment service processing method, according to Implementation 1 of the present application.

Implementation 1 provides an electronic payment service processing method, to resolve a problem in the existing technology that leads to poor user experience during electronic payment service processing. The problem is when electronic payment service processing fails, many operations are needed to perform electronic payment service processing by using a returned repayment entrance. A schematic flowchart illustrating the method is shown in FIG. 1. The method includes the following steps:

Step 11: A server receives a first service information set needed for electronic payment service processing, to perform the electronic payment service processing.

The first service information set is a service information set needed for the electronic payment service processing.

In actual application, the server usually needs to receive service information needed for service processing, to perform the service processing. Different types of services to be processed usually need different service information sets. In addition, different service information sets can be needed even if services to be processed are of the same type. For example, the electronic payment service processing and document encryption service processing need different service information sets. The electronic payment service processing can need different service information sets (that is, first service information sets) based on different payment types such as online bank payment and code scanning payment.

To complete the electronic payment service processing, the server needs to receive payment channel information, payment authentication information, payment-related protocol agreement information, etc. that are submitted by a user. A payment channel is a capital flow carrier. In actual application, the payment channel can be a debit card of Industrial and Commercial Bank of China (ICBC), a credit card of Agricultural Bank of China (ABC), etc. The payment authentication information is used to verify the user's identity and/or rights, and can be a password, a fingerprint, a smart card, etc. in actual application. Information needed for performing the electronic payment service processing forms the first service information set. In actual application, after receiving the first service information, the server can perform the electronic payment service processing in real time based on the first service information set, or by using a non-real time method in a special application scenario such as reserved payment.

Step 12: The server determines whether the electronic payment service processing fails, and if yes, determines, based on the type of the electronic payment service processing failure, whether to generate a re-payment entrance, where the re-payment entrance can be associated with a second service information set, and the second service information set is formed after a corresponding element in the first service information set that causes the electronic payment service processing failure is adjusted.

Service processing often fails during the electronic payment service processing. These failures can be caused by a failure in verifying the first service information set or other reasons such as the server. Therefore, in actual application, when performing the electronic payment service processing, the server usually needs to monitor whether the electronic payment service processing fails. When the electronic payment service processing fails, the server can record the type of the electronic payment service processing failure, to determine whether to generate the re-payment entrance.

If the re-payment entrance is generated, the user can submit, through the re-payment entrance, the second service information set that can be associated with the re-payment entrance, to perform the electronic payment service processing again. The second service information set is a set of service information that the user needs to submit when the electronic payment service processing is performed by using the re-payment entrance. In actual operations, the user can submit an electronic payment service processing request to the server by using a computer, a mobile phone, a smart TV, an iPad, etc. Therefore, the server can generate the following forms of re-payment entrance: a web page hyperlink, and/or a shake sensor, and/or a gesture recognizer, and/or an expression recognizer, and/or a touchscreen button, etc.

Step 13: After generating the re-payment entrance and receiving an instruction indicating that the re-payment entrance is triggered, the server performs the electronic payment service processing by using elements in the second service information set and a third service information set, where the third service information set is a difference set of the first service information set and the second service information set.

There are a plurality of types of electronic payment service processing failures, such as insufficient balance in a selected payment channel, incorrect payment authentication information, operation timeout, server exception, network interruption, etc. When the electronic payment service processing fails, the server generates the re-payment entrance based on the type of the electronic payment service processing failure. The server also needs to determine the third service information set that is included in the first service information set, and needed for performing the electronic payment service processing by using the re-payment entrance. The third service information set is a nonempty subset of the first service information set. The first service information set usually has a plurality of nonempty subsets. The third service information set can even be the first service information set itself. It is worthwhile to note that the third service information set cannot be an empty set.

For example, during the electronic payment service processing, the server usually needs to receive the payment channel information, the payment authentication information, and the payment-related protocol agreement information that are submitted by the user, to perform the electronic payment service processing. When the type of the electronic payment service processing failure is insufficient balance in the payment channel, the third service information set can be selected by using a plurality of methods. For example, the first service information set can be selected as the third service information set; information other than the payment channel information in the first service information set can be selected as the third service information set; or any one of the payment authentication information and the payment-related protocol agreement information can be selected as the third service information set.

In actual application, preferably, the third service information set is a subset of the first service information set and is determined based on the type of the electronic payment service processing failure. That is, the third service information set is service information in the first service information set other than the service information that causes the electronic payment service processing failure. As such, the third service information set that is included in the first service information set and needed for performing the electronic payment service processing by using the re-payment entrance is determined based on the type of the electronic payment service processing failure. For the electronic payment service processing, the third service information set is preferably a set including the payment authentication information and the payment-related protocol agreement information.

After the user triggers the re-payment entrance, the server receives the second service information set submitted by the user through the re-payment entrance, obtains the third service information set included in the first service information set, and performs the electronic payment service processing by using the elements in the second service information set and the third service information set.

The first service information set for the electronic payment service processing can usually include the payment channel information, the payment authentication information, the payment-related protocol agreement information, etc. If the payment fails due to the payment channel in the first service information set, the payment authentication information and the payment-related protocol agreement information can be usually selected as the third service information set. After the re-payment entrance is generated and triggered, the server receives the second service information set, obtains the third service information set, and performs service processing by using the second service information set and the third service information set. It is worthwhile to note that the second service information set can usually be new payment channel information.

More specifically, after obtaining the third service information set from the first service information set, the server usually stores the third service information set. After the re-payment entrance is triggered, the server receives the second service information set submitted by the user and obtains the stored third service information set, to perform electronic payment service processing. In actual application, the stored third service information set can be obtained by using a plurality of methods. A preferred solution is: establishing a mapping relationship between the re-payment entrance and the third service information set, and when the re-payment entrance is triggered, obtaining the third service information set based on the mapping relationship when the re-payment entrance is triggered.

According to the electronic payment service processing method provided in Implementation 1, when the electronic payment service processing performed based on the first service information set fails, the server can generate the re-payment entrance based on the type of the electronic payment service processing failure; receive the second service information set submitted by the user through the re-payment entrance, where the second service information set is formed after the corresponding element in the first service information set that causes the electronic payment service processing failure is adjusted; and perform the electronic payment service processing by using the elements in the second service information set and the third service information set, where the third service information set is the difference set of the first service information set and the second service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 2

Figure 2A:
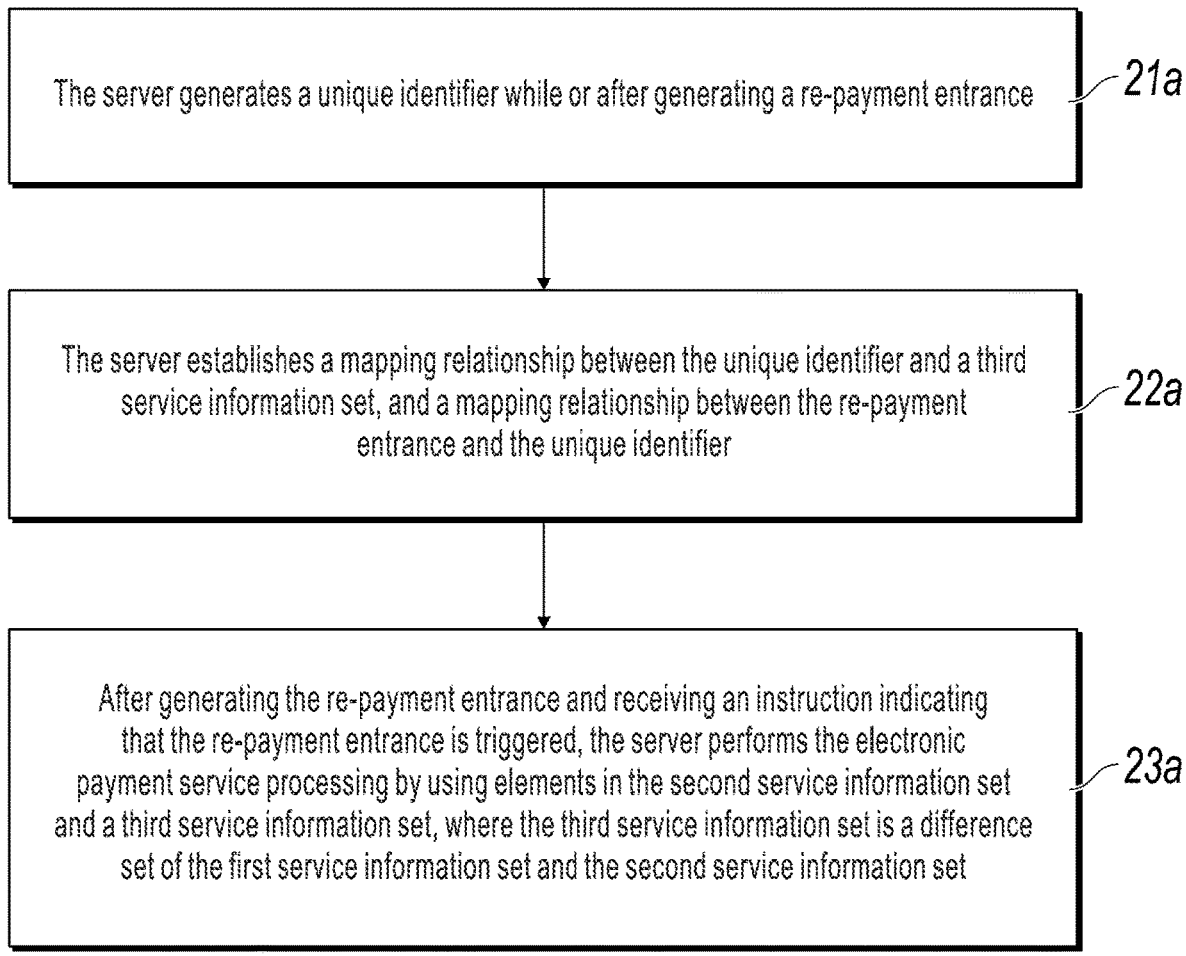
FIG. 2(a) is a schematic flowchart illustrating implementation of unique identifier association, according to Implementation 2 of the present application.
Figure 2B:
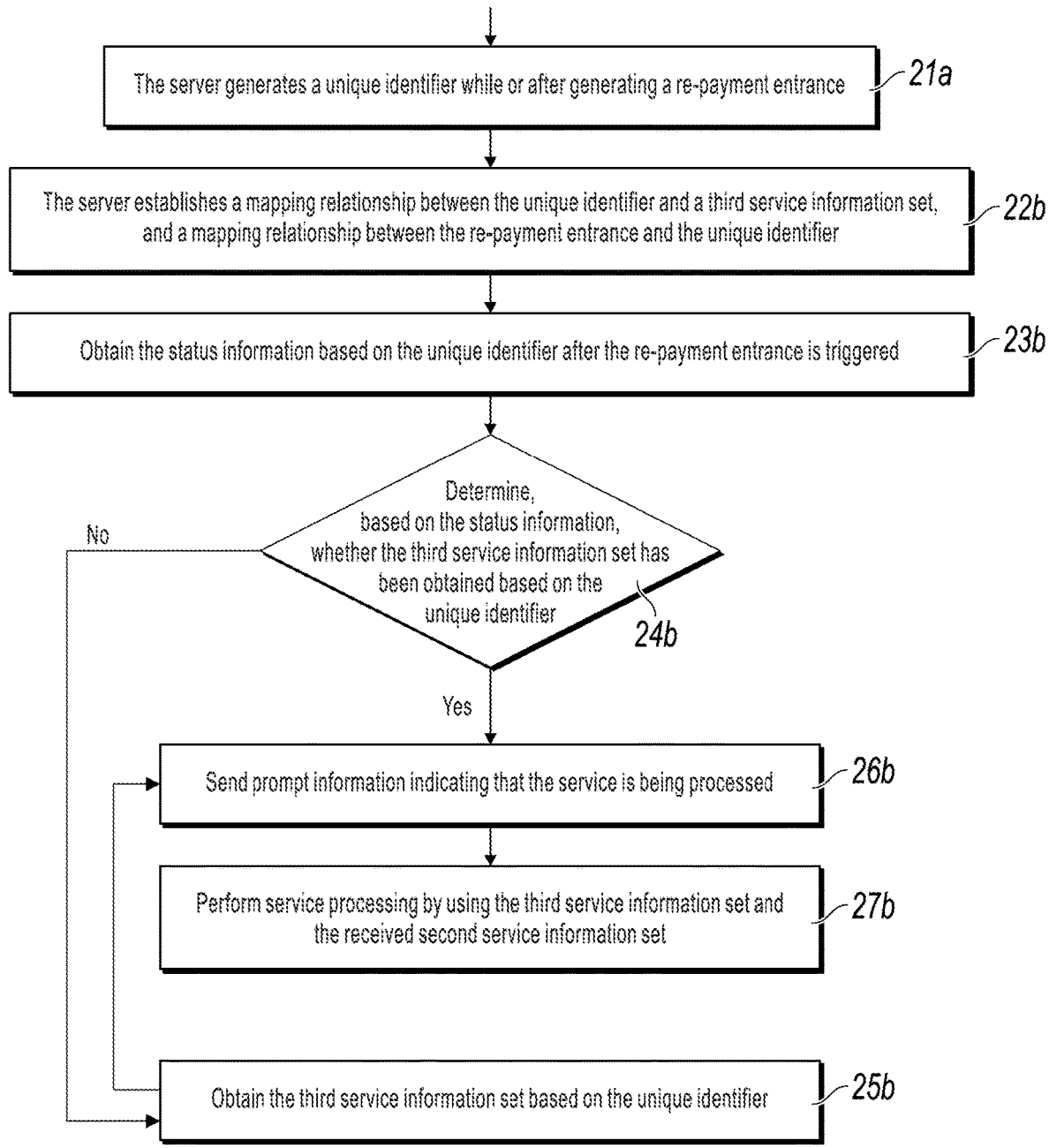
FIG. 2(b) is a schematic flowchart illustrating implementation of unique identifier association, according to Implementation 4 of the present application.

As mentioned in step 13 in Implementation 1, after generating the re-payment entrance and receiving the instruction indicating that the re-payment entrance is triggered, the server performs the electronic payment service processing by using the elements in the second service information set and the third service information set. The third service information set is the difference set of the first service information set and the second service information set. Actually, before the re-payment entrance is triggered, the server can establish a mapping relationship between the re-payment entrance and the third service information set. When receiving the instruction indicating that the re-payment entrance is triggered, the server obtains the third service information set based on the mapping relationship. As such, Implementation 2 of the present application is formed. Compared with Implementation 1, Implementation 2 of the present application includes steps 21*a* and 22*a* before step 13 in Implementation 1, step 13 is changed to step 23*a*, and other steps remain the same, as shown in FIG. 2(*a*).

Step 21*a*: The server generates a unique identifier while or after generating the re-payment entrance.

The unique identifier is a unique serial number generated based on the electronic payment service processing. Usually, the unique identifier can be generated by using global universal identification (GUID) or incrementally.

Step 22*a*: The server establishes a mapping relationship between the unique identifier and the third service information set, and a mapping relationship between the re-payment entrance and the unique identifier.

The server establishes the mapping relationship between the unique identifier and the third service information set after determining the third service information set. As such, after the server obtains the unique identifier, the server can obtain the third service information set based on the mapping relationship. In actual application, the mapping relationship can be established by using a plurality of methods. For example, the unique identifier is simply associated with the third service information set, or the unique identifier is added to the third service information set. The technical effect of the present implementation can be achieved provided that a mapping relationship is established between the unique identifier and the third service information set, and the server can obtain the third service information set based on the mapping relationship after obtaining the unique identifier. Therefore, how to establish the mapping relationship and what type of mapping relationship is established are not limited in the present implementation.

After establishing the mapping relationship between the re-payment entrance and the unique identifier, the server can obtain the unique identifier based on the mapping relationship when the re-payment entrance is triggered.

It is worthwhile to note that, in step 22*a*, the mapping relationship between the unique identifier and the third service information set, and the mapping relationship between the re-payment entrance and the unique identifier can be established by using the same method or different methods. Even in actual application such as electronic payment, when the payment fails, the server can usually return the re-payment entrance and the corresponding unique identifier to the user. The user triggers the re-payment entrance to return the unique identifier to the server. A technical effect that needs to be achieved in step 22*a* is to establish the mapping relationship between the re-payment entrance and the unique identifier, so that the server can obtain the unique identifier based on the mapping relationship when the re-payment entrance is triggered.

Step 23*a*: After generating the re-payment entrance and receiving an instruction indicating that the re-payment entrance is triggered, the server performs the electronic payment service processing by using elements in the second service information set and the third service information set, where the third service information set is a difference set of the first service information set and the second service information set.

It is worthwhile to note that, in steps 21*a* and 22*a*, the re-payment entrance is associated with the third service information set by using the unique identifier, so that the server can obtain the third service information set after the re-payment entrance is triggered. Therefore, steps 21a and 22a can be performed before or after the re-payment entrance is generated based on the type of the electronic payment service processing failure. Associating the third service information set and the re-payment entrance by using the unique identifier does not affect the effect of the present implementation, provided that steps 21a and 22a have been performed when the re-payment entrance is triggered.

According to the electronic payment service processing method provided in Implementation 2, the re-payment entrance is associated with the third service information set by using the generated unique identifier, so that the server can directly obtain the third service information set when the re-payment entrance is triggered, and the user does not need to submit the third service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 3

Figure 3:
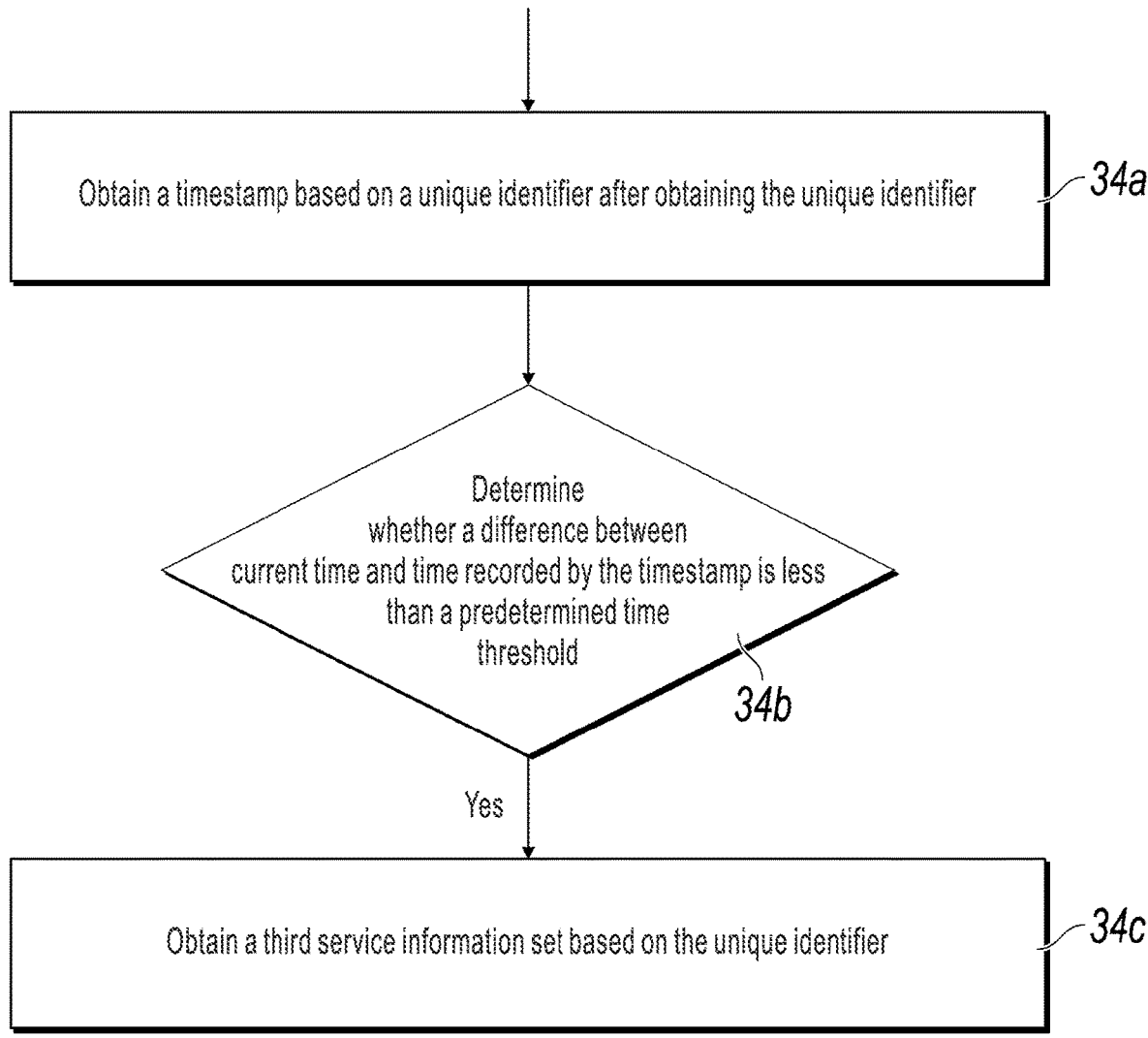
FIG. 3 is a schematic flowchart illustrating implementation of controlling a unique identifier by a timestamp, according to Implementation 3 of the present application.

As mentioned in step 22a in Implementation 2, a mapping relationship is established between the unique identifier and the third service information set. Actually, a mapping relationship can be further established between the unique identifier and a timestamp to ensure that the unique identifier is valid in a period of time. The timestamp is used to record time when the unique identifier is generated. As such, the third service information set can be obtained based on the mapping relationship between the unique identifier and the timestamp. As such, Implementation 3 of the present application is formed. Compared with Implementation 2, in Implementation 3 of the present application, "obtaining the unique identifier based on the mapping relationship between the re-payment entrance and the unique identifier, and obtaining the third service information set based on the unique identifier" can be changed to steps 34a, 34b, and 34c, and other steps remain the same, as shown in FIG. 3.

Step 34a: Obtain a timestamp based on the unique identifier after obtaining the unique identifier.

Step 34b: Determine whether a difference between current time and the time recorded by the timestamp is less than a predetermined time threshold. If yes, perform step 34c.

More specifically, in actual application, the time threshold can be set to 5 (or 3 minutes). After the timestamp is obtained based on the unique identifier, when the difference between the current time and the time recorded by the timestamp is less than 5 minutes, it indicates that the unique identifier is valid, and step 34c is performed.

Step 34c: Obtain the third service information set based on the unique identifier.

According to the electronic payment service processing method provided in Implementation 3, the mapping relationship is established between the unique identifier and the timestamp. As such, when the re-payment entrance is triggered, whether the unique identifier is valid can be determined by determining whether the difference between the current time and the time recorded by the timestamp is less than the predetermined time threshold. The third service information set can be obtained based on the unique identifier only when the unique identifier is valid. Therefore, the following problem is resolved: When electronic payment service processing fails, before the electronic payment service processing is performed again, the user needs to resubmit all service information needed for the electronic payment service processing. In addition, a validity problem of the unique identifier is resolved by setting a valid time for the unique identifier.

Implementation 4

As mentioned in step 22a in Implementation 2, a mapping relationship is established between the unique identifier and the third service information set. Actually, a mapping relationship can be further established between the unique identifier and status information to ensure that the service is processed only once. The status information is used to record whether the third service information set has been obtained based on the unique identifier. As such, Implementation 4 of the present application is formed. Compared with Implementation 2, in Implementation 4 of the present application, step 22a is changed to step 22b, step 23a is changed to steps 23b, 24b, 25b, 26b, and 27b, and other steps remain the same.

Step 22b: Establish a mapping relationship between the third service information set and the unique identifier, and a mapping relationship between status information and the unique identifier.

Step 23b: Obtain the status information based on the unique identifier after the re-payment entrance is triggered.

Step 24b: Determine, based on the status information, whether the third service information set has been obtained based on the unique identifier. If no, perform step 25b. If yes, perform step 26b.

Step 25b: Obtain the third service information set based on the unique identifier, and then perform step 26b.

Step 26b: Send prompt information indicating that the service is being processed.

Step 27b: Perform service processing by using the third service information set and the received second service information set.

The mapping relationship between the third service information set and the unique identifier, and the mapping relationship between the status information and the unique identifier are established. After the user triggers the re-payment entrance, the server can obtain the unique identifier and obtain the status information based on the unique identifier. When the status information records that the third service information set has not been obtained based on the unique identifier, the server obtains the third service information set and continues to perform the electronic payment service processing. When the status information records that the third service information set has been obtained based on the unique identifier, the server can send the information indicating that the service is being processed for the user.

In actual application, after the third service information set is obtained based on the unique identifier, atomic updating usually needs to be performed on the status information. As such, operation idempotence can be ensured when the re-payment entrance is triggered by the user for a plurality of times. That is, after the third service information set is obtained based on the unique identifier, the status information needs to be updated in time to record that the third service information set has been obtained. This ensures that the electronic payment service processing is performed only once, when the user triggers the re-payment entrance for a plurality of times. As such, the user does not perform payment for a plurality of times by using the re-payment entrance.

According to the electronic payment service processing method provided in Implementation 4, the mapping relationship is established between the unique identifier and the status information, so that whether the third service information set has been obtained can be determined based on the status information when the re-payment entrance is triggered. The third service information set can be obtained based on the unique identifier only when the third service information set has not been obtained. Therefore, the following problem is resolved: When electronic payment service processing fails, before the electronic payment service processing is performed again, the user needs to resubmit all service information needed for the electronic payment service processing. In addition, the status information ensures that the service can be processed only once, resolving a problem that the service may be processed for a plurality of times.

Implementation 5

Figure 4A:
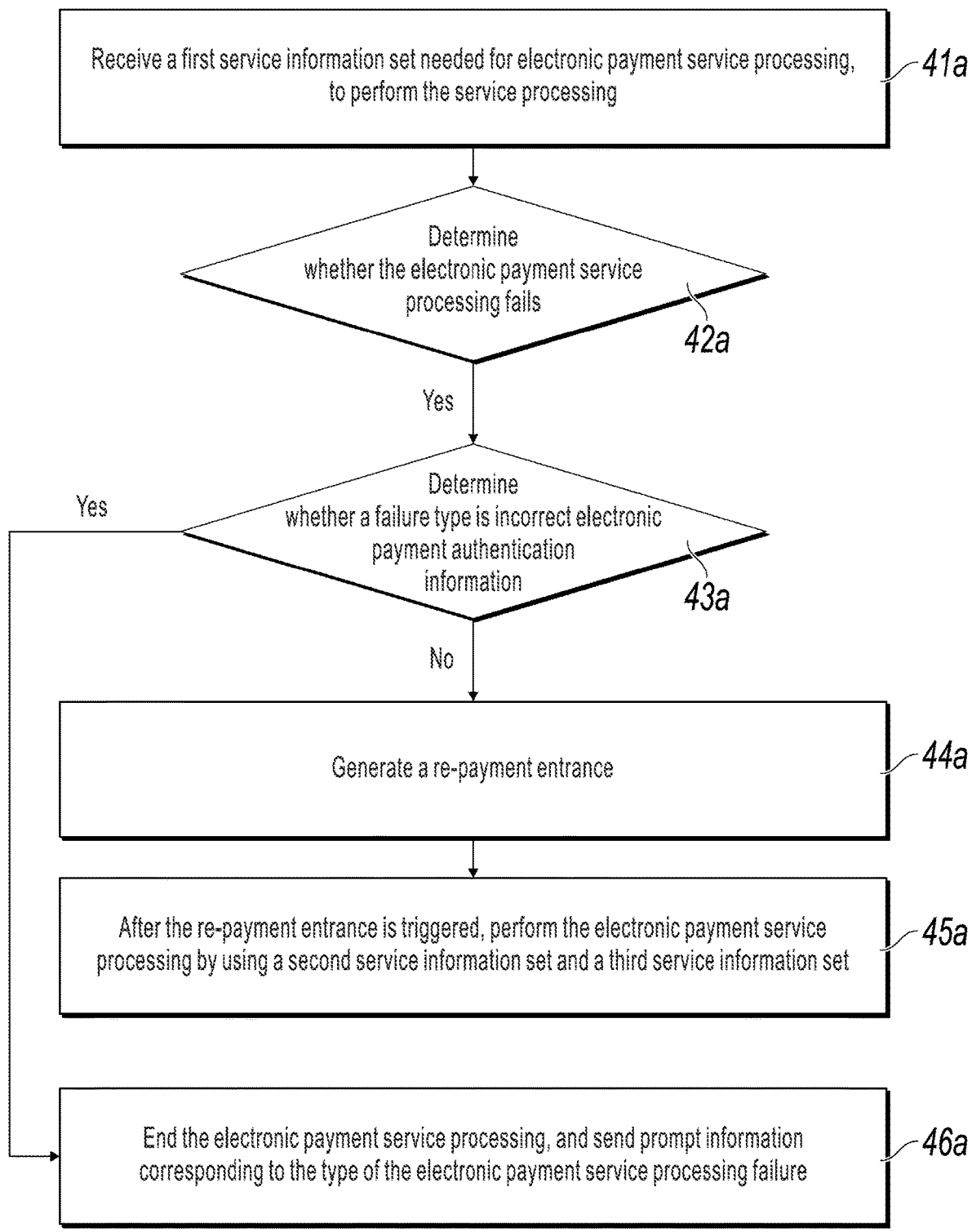
FIG. 4(a) is a schematic flowchart illustrating implementation of controlling electronic payment service processing by using electronic payment authentication information, according to Implementation 5 of the present application.
Figure 4B:
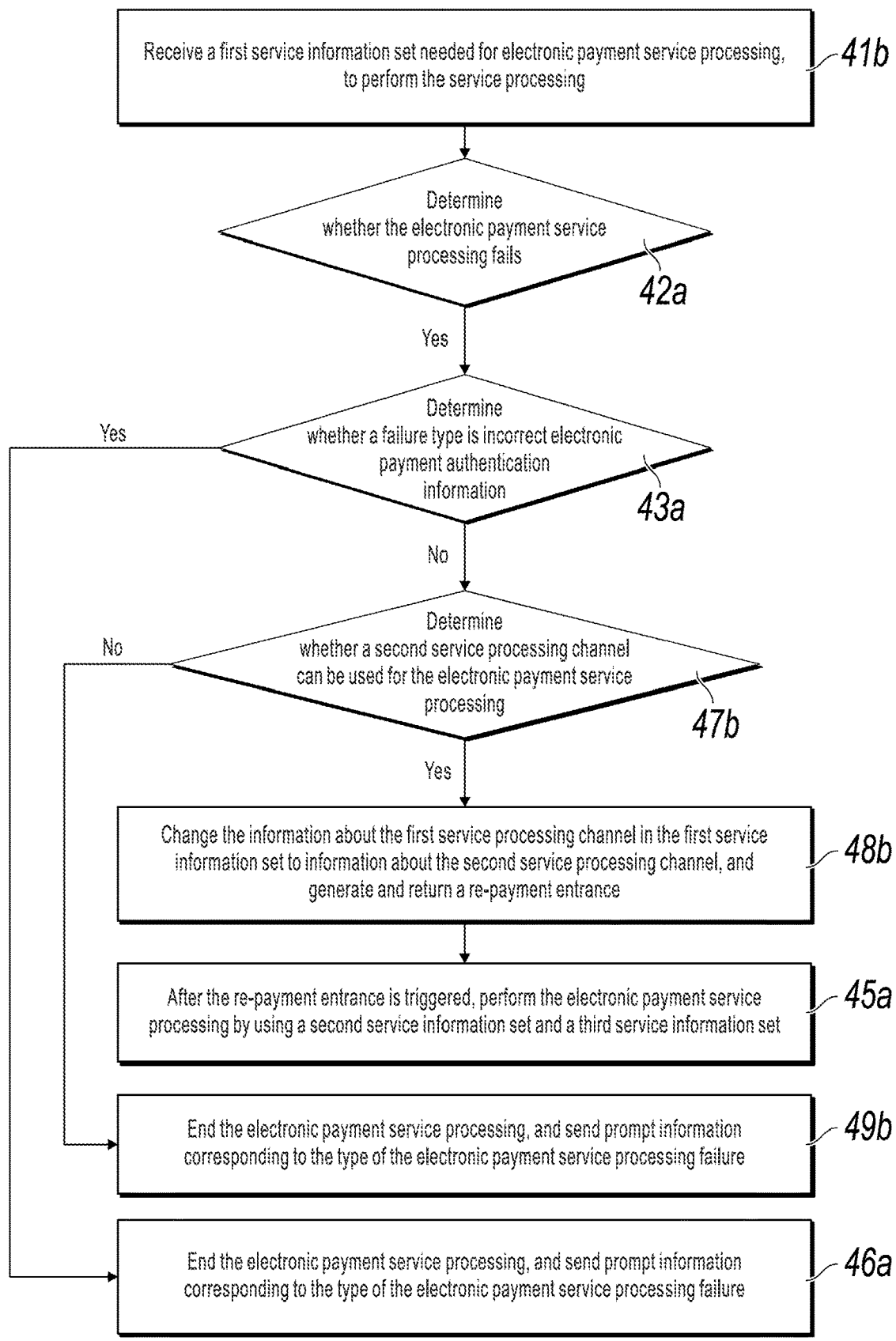
FIG. 4(b) is a schematic flowchart illustrating implementation of controlling electronic payment service processing by using electronic payment authentication information, according to Implementation 6 of the present application.

As mentioned in step 12 in Implementation 1, whether to generate the re-payment entrance is determined based on the type of the electronic payment service processing failure. Because there are a plurality of types of electronic payment service processing failures, a plurality of methods are available for determining, based on the type of the electronic payment service processing failure, whether to generate the re-payment entrance. When the received first service information includes service processing authentication information, whether to generate the re-payment entrance is determined based on whether the type of the service processing failure includes incorrect service processing authentication information. As such, Implementation 5 of the present application is formed. Step 11 in Implementation 1 is changed to step 41*a* in the present implementation, step 13 in Implementation 1 is changed to step 45*a* in the present implementation, and step 12 in Implementation 1 is changed to steps 43*a*, 44*a*, and 46*a* in the present implementation, as shown in FIG. 4(*a*).

Step 41*a*: Receive a first service information set needed for electronic payment service processing, to perform the service processing.

Step 42*a*: Determine whether the electronic payment service processing fails.

Step 43*a*: Determine whether the type of the electronic payment service processing failure is incorrect electronic payment authentication information. If no, perform step 44*a*. If yes, perform step 46*a*. Step 44*a*: Generate a re-payment entrance.

Step 46*a*: End the electronic payment service processing, and send prompt information corresponding to the type of the electronic payment service processing failure.

When the submitted first service information set includes electronic payment processing authentication information, and the electronic payment service processing fails, to ensure the security of the electronic payment service processing, whether the type of the electronic payment service processing failure includes the incorrect electronic payment authentication information needs to be determined. If the type of the electronic payment service processing failure includes the incorrect electronic payment authentication information, the electronic payment service processing is ended, and the prompt information corresponding to the type of the electronic payment service processing failure is sent to the user. If the type of the electronic payment service processing failure does not include the incorrect electronic payment authentication information, the re-payment entrance is generated. In addition, in actual operations, if the type of the electronic payment service processing failure is another type, such as operation timeout, of the electronic payment service processing failure that causes the termination of the electronic payment service processing, the server usually ends the electronic payment service processing, and sends prompt information corresponding to the type of the electronic payment service processing failure to the user.

According to the electronic payment service processing method provided in Implementation 5, when the first service information set includes the electronic payment authentication information, and the electronic payment service processing fails, whether the type of the electronic payment service processing failure is incorrect electronic payment authentication information needs to be determined. Whether to generate the re-payment entrance is determined based on a determining result, to ensure the security of the electronic payment service processing. Therefore, the following problem is resolved: When electronic payment service processing fails, before the electronic payment service processing is performed again, the user needs to resubmit all service information needed for the electronic payment service processing. In addition, a security problem during the electronic payment service processing is resolved.

Implementation 6

As mentioned in step 41*a* in Implementation 5, the server receives the first service information set needed for electronic payment service processing, to perform the electronic payment service processing. The first service information set can include information about a first service processing channel. Therefore, before generating the re-payment entrance in step 44*a*, the server can further determine whether a second service processing channel can be used for the electronic payment service processing, and generate and return the re-payment entrance based on a determining result. As such, Implementation 6 of the present application is formed. Step 41*a* in Implementation 5 is changed to step 41*b* in the present implementation, step 44*a* in Implementation 5 is changed to steps 47*b*, 48*b*, and 49*b* in the present implementation, and other steps remain the same.

Step 41*b*: Receive a first service information set needed for electronic payment service processing, to perform the electronic payment service processing, where the first service information set includes electronic payment authentication information and information about a first service processing channel.

Step 47*b*: Determine whether a second service processing channel can be used for the electronic payment service processing. If yes, perform step 48*b*. If no, perform step 49*b*.

Step 48*b*: Change the information about the first service processing channel in the first service information set to information about the second service processing channel, and generate and return a re-payment entrance.

The second service processing channel is a service processing channel that can be used for the electronic payment service processing other than the first service processing channel.

Step 49*b*: End the electronic payment service processing, and send prompt information corresponding to the type of the electronic payment service processing failure.

In the present implementation, the first service information set submitted by the user includes the service processing authentication information and the information about the first service processing channel. When the service processing fails, if the server detects that the type of the electronic payment service processing failure does not include incorrect service processing authentication information, and the alternative second service processing channel is available for the service processing, the server changes the information about the first service processing channel in the first service information to the information about the second service processing channel, and sends the re-payment entrance to the user. As such, the user does not need to enter the service processing authentication information or service processing channel information when triggering the re-payment entrance to perform service processing. In other words, the second service information does not include the service processing authentication information or the service processing channel information. In addition, when sending the re-payment entrance to the user, the server can further send prompt information to notify the user that the service processing channel has been changed.

More specifically, when the type of the electronic payment service processing failure is only relevant to the information about the first service processing channel, and the alternative second service processing channel is available for the service processing, the server sends the re-payment entrance to the user. The user performs the service processing by using the re-payment entrance. The second service information set that needs to be submitted is an empty set, which can mean that the user does not need to submit the second service information set when performing the service processing by using the re-payment entrance.

For the electronic payment service processing, the user needs to submit payment channel information, payment authentication information, and payment-related protocol agreement information to perform electronic payment. When the payment fails, if a type of the payment failure does not include incorrect electronic payment authentication information, and the user has a second payment channel with sufficient balance, the server changes the payment channel to the second payment channel and generates a re-payment entrance. As such, the user only needs to trigger the re-payment entrance to complete the electronic payment by using the server.

According to the electronic payment service processing method provided in Implementation 6, when the first service information set includes the electronic payment authentication information and the information about the first service processing channel, and the electronic payment service processing fails, if the type of the electronic payment service processing failure does not include incorrect electronic payment authentication information, and the second service processing channel is available, the second service information set that the user needs to enter when performing the electronic payment service processing by using the re-payment entrance generated by the server does not include the electronic payment authentication information or the service processing channel information. Therefore, the following problem is resolved: When electronic payment service processing fails, before the electronic payment service processing is performed again, the user needs to resubmit all service information needed for the electronic payment service processing. In addition, a security problem during the electronic payment service processing is resolved.

Implementation 7

Figure 5:
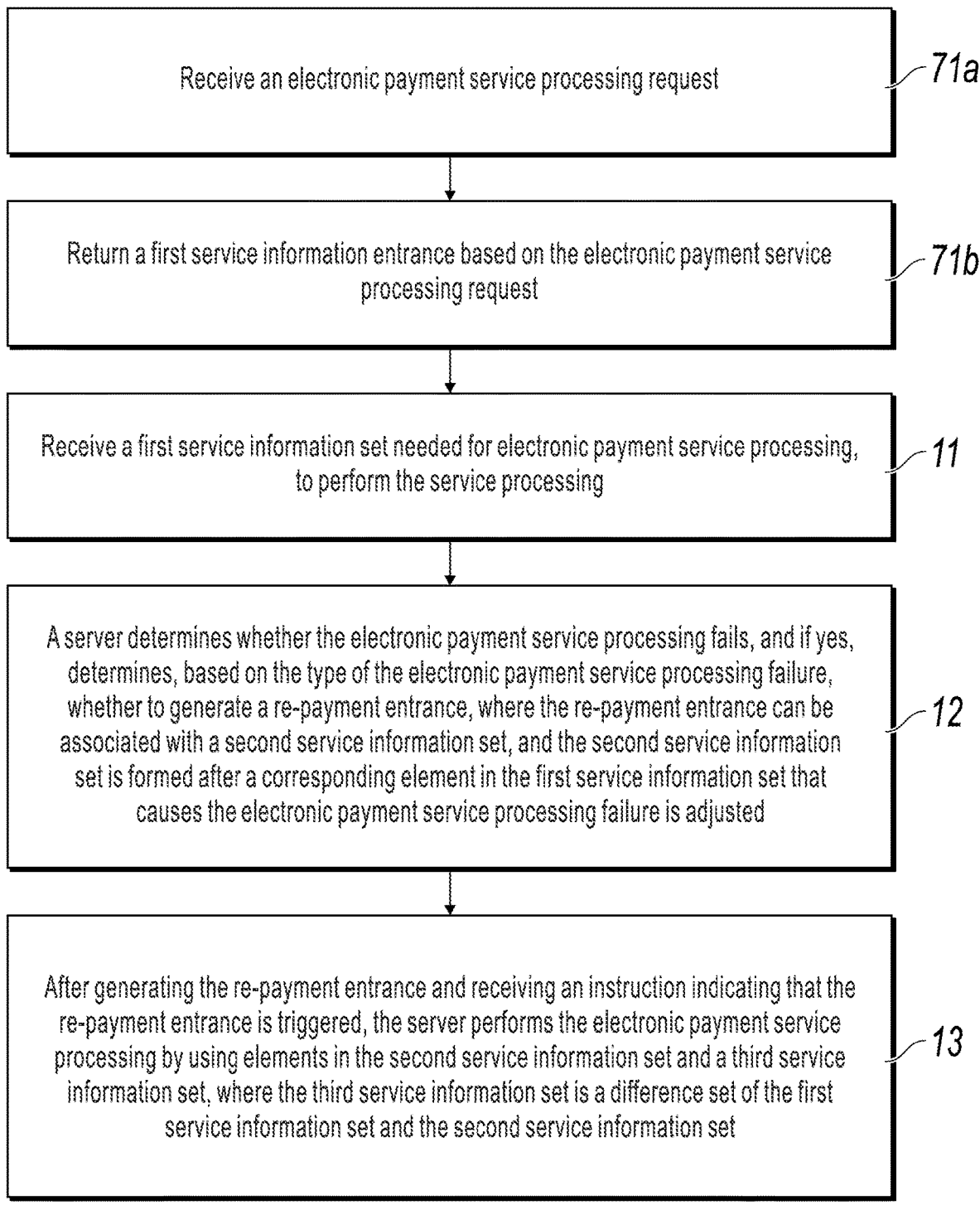
FIG. 5 is a schematic flowchart illustrating implementation of an electronic payment service processing method, according to Implementation 7 of the present application.

As mentioned in step 11 in Implementation 1, the server receives the first service information set needed for electronic payment service processing, to perform the electronic payment service processing. Actually, before step 11, the implementation can further include steps such as receiving an electronic payment service processing request. As such, Implementation 7 of the present application is formed. Compared with Implementation 1, Implementation 7 includes steps 71a and 71b before step 11, and other steps remain the same, as shown in FIG. 5.

Step 71a: Receive an electronic payment service processing request.

A server receives an electronic payment service processing application submitted by a user. The user can submit the electronic payment service processing request to the server by using different methods such as a computer, a mobile phone, a smart TV, and an iPad.

Step 71b: Return a first service information entrance based on the electronic payment service processing request.

A first service information set is submitted through the first service information entrance, to perform the electronic payment service processing.

The server returns the first service information entrance to the user based on the received electronic payment service processing request. The user submits the first service information set through the first service information entrance, to perform the electronic payment service processing. The first service information set is user information needed for processing a received service, and includes service processing channel information, electronic payment authentication information, payment-related protocol agreement information, etc. After receiving the electronic payment service processing request submitted by the user, the server returns a payment entrance to the user. The user selects a payment channel, submits payment authentication and payment-related protocol agreement information, etc. through the payment entrance. The payment entrance is the first service information entrance. The payment channel information, payment authentication information, payment-related protocol agreement information and such form the first service information set. In addition, in actual application, the first service information set can be submitted in a plurality of times. For example, the user can first agree on a payment-related protocol, submit the payment channel information, and then submit the payment authentication information.

According to the electronic payment service processing method provided in Implementation 7, the server returns the first service information entrance to the user based on the received service processing request. When the service processing fails, the server returns a re-payment entrance to the user based on the type of the service processing failure. A second service information set submitted by the user through the re-payment entrance during the service processing includes less information than the first service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 8

Figure 6:
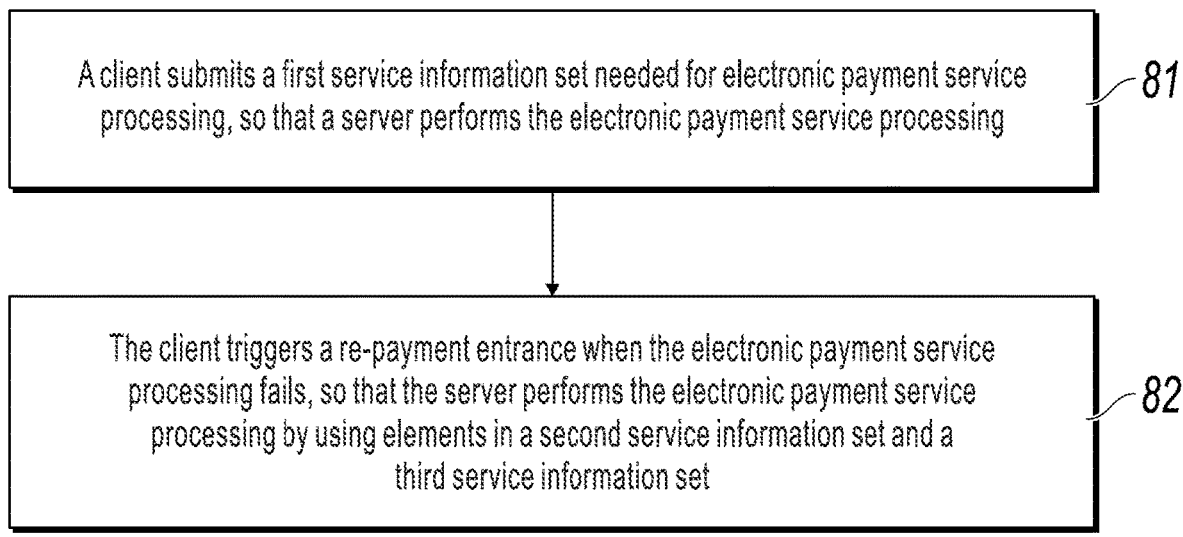
FIG. 6 is a schematic flowchart illustrating implementation of an electronic payment service processing method, according to Implementation 8 of the present application.

Implementation 8 provides an electronic payment service processing method, to resolve a problem in the existing technology that leads to poor user experience during electronic payment service processing. The problem is when electronic payment service processing fails, the user needs to perform many operations before performing the electronic payment service processing again. A schematic flowchart illustrating the method is shown in FIG. 6. The method includes the following steps:

Step 81: A client submits a first service information set needed for electronic payment service processing, so that a server performs the electronic payment service processing.

Step 82: The client triggers a re-payment entrance when the electronic payment service processing fails, so that the server performs the electronic payment service processing by using elements in a second service information set and a third service information set, where the re-payment entrance is generated by the server based on a type of the electronic payment service processing failure and can be associated with the second service information set; the second service information set is formed after the server adjusts a corresponding element in the first service information set that causes the electronic payment service processing failure; and the third service information set is a difference set of the first service information set and the second service information set.

The user submits the first service information set needed for the service processing, so that the server performs the electronic payment service processing. When the electronic payment service processing fails, the server generates the re-payment entrance based on the type of the electronic payment service processing failure and presents the entrance to the user. The user triggers the re-payment entrance and submits the second service information set, so that the server performs the electronic payment service processing by using the second service information set and the third service information set.

According to the electronic payment service processing method provided in Implementation 8, when the electronic payment service processing fails, the server generates the re-payment entrance based on the type of the electronic payment service processing failure and presents the entrance, and the user submits the second service information set through the re-payment entrance, so that the server performs the electronic payment service processing by using the second service information set and the third service information set that is included in the first service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 9

Figure 7:
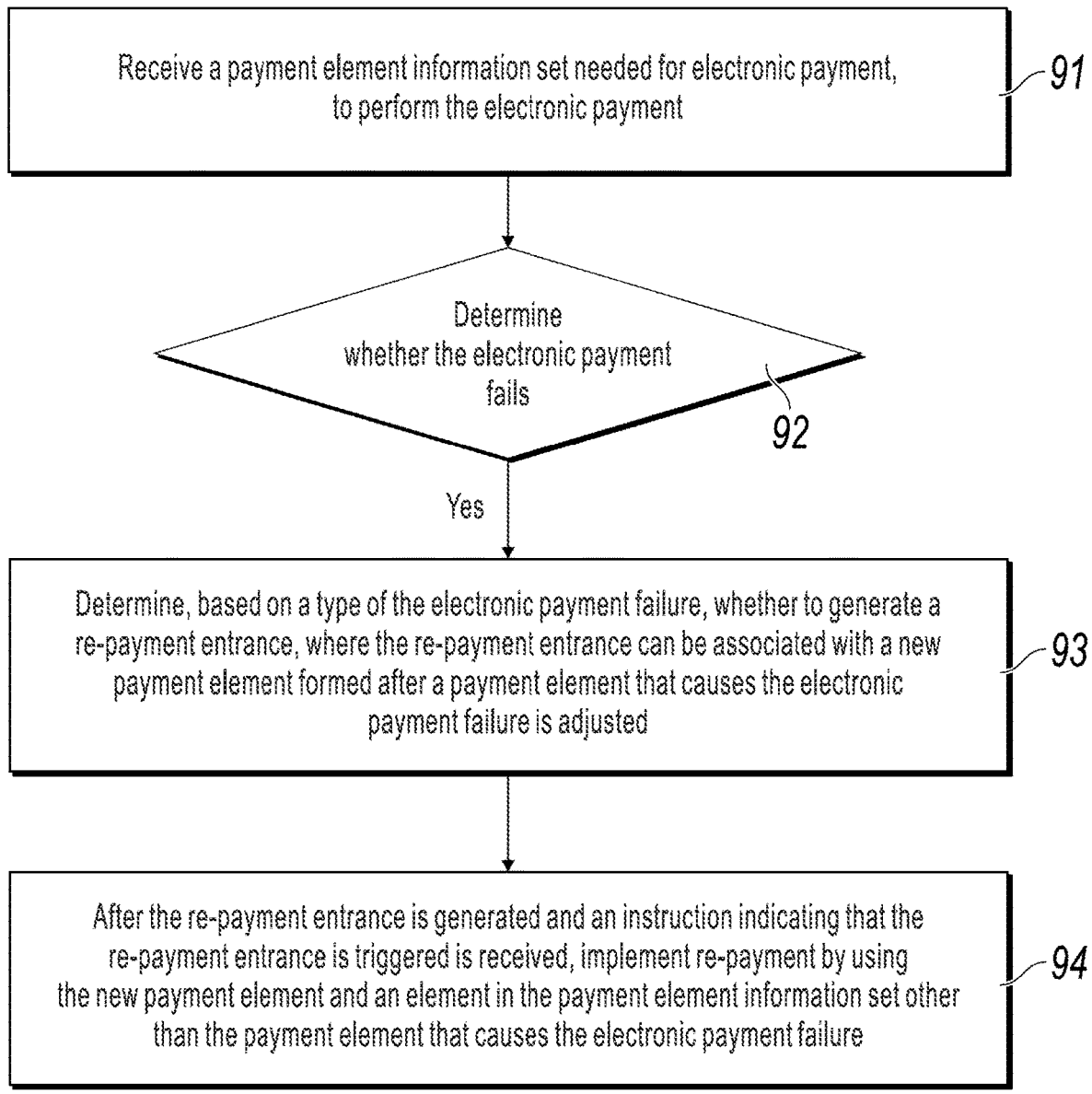
FIG. 7 is a schematic flowchart illustrating implementation of an electronic payment method, according to Implementation 9 of the present application.

Implementation 9 provides an electronic payment method, to resolve a problem in the existing technology that leads to poor user experience. The problem is when electronic payment fails, the user needs to submit much information before performing the electronic payment again. A schematic flowchart illustrating the method is shown in FIG. 7. The method includes the following steps:

Step 91: Receive a payment element information set needed for electronic payment, to perform the electronic payment.

Payment element information is information needed for processing a payment service. In actual application, different payment services can correspond to different payment element information. For example, in credit card payment, payment element information can usually be a credit card number, a password, a payment amount, etc. In online bank payment, payment element information can usually be an online bank card number, a password, verification code, etc. In payment performed through two-dimensional code scanning, payment element information can usually be user account information, two-dimensional code information, the amount of money, etc. In actual application, the payment element information can usually be payment channel information, payment authentication information, payment-related protocol agreement information, etc. A payment channel is a capital flow carrier. In actual application, the payment channel can be a debit card of ICBC, a credit card of ABC, etc. The payment authentication information is used to verify the user's identity and/or rights, and can be a password, a fingerprint, a smart card, etc. in actual application.

The electronic payment is performed after the payment element information set needed for the electronic payment is received.

Step 92: Determine whether the electronic payment fails. If yes, perform step 93.

The payment may fail due to various reasons, for example, insufficient balance in a selected bank card, a credit limit on a selected credit card, incorrect payment authentication information, and network interruption. Therefore, in actual application, whether payment service processing fails usually needs to be monitored. In addition, when the electronic payment fails, a failure type can be determined.

Step 93: Determine, based on a type of the electronic payment failure, whether to generate a re-payment entrance, where the re-payment entrance can be associated with a new payment element formed after a payment element that causes the electronic payment failure is adjusted.

After the payment fails, the server usually needs to send the re-payment entrance based on the type of the electronic payment failure, so that the user performs the payment again.

During the payment process, the payment is usually authenticated to enhance payment security. Therefore, the payment element information usually includes the payment authentication information. When the type of the electronic payment failure includes incorrect payment authentication information, to ensure payment security, the server usually does not generate the re-payment entrance. In actual application, if a user operation times out, the server usually does not generate the re-payment entrance neither. When the electronic payment fails, the server can determine, based on the failure type and actual needs, whether to generate the re-payment entrance.

Step 94: When the re-payment entrance is generated and an instruction indicating that the re-payment entrance is triggered is received, implement re-payment by using the new payment element and an element in the payment element information set other than the payment element that causes the electronic payment failure.

For example, the payment element information in step 91 can be a bank card number, a password, and a payment amount. When the electronic payment fails due to insufficient balance in the bank card, the password and the payment amount can usually be used as elements other than the payment element that causes the electronic payment failure. When performing re-payment by using the re-payment entrance, the user needs to enter a new bank card number only, as the new payment element.

According to the electronic payment method provided in Implementation 9, when the electronic payment performed based on the payment element information set fails, the server can determine, based on the type of the electronic payment failure, whether to generate the re-payment entrance. The re-payment entrance can be associated with the new payment element formed after the payment element that causes the electronic payment failure is adjusted. Then the server receives the new payment element submitted by the user through the re-payment entrance, and implements the re-payment by using the new payment element and the element in the payment element information set other than the payment element that causes the electronic payment failure. Therefore, the following problem in the existing technology is resolved: When electronic payment fails, before performing the electronic payment again, the user needs to resubmit all payment element information needed for the electronic payment. As such, user experience is improved.

Further, there can be a plurality of implementations for step 93, and the following two implementations are used as examples.

If the electronic payment fails due to insufficient balance in a payment channel, the server generates a re-payment entrance that can be associated with a payment channel with sufficient balance. Correspondingly, in step 94, after the instruction indicating that re-payment entrance is triggered is received, the re-payment is implemented by using the payment channel with sufficient balance and an element in the payment element information set other than the payment channel.

If the electronic payment fails because the payment channel is busy with services, the server generates a re-payment entrance that can be associated with a payment channel that is idle with services. Correspondingly, in step 94, after the instruction indicating that the re-payment entrance is triggered is received, the re-payment is implemented by using the idle payment channel and element in the payment element information set other than the busy payment channel.

Implementation 10

Figure 8:
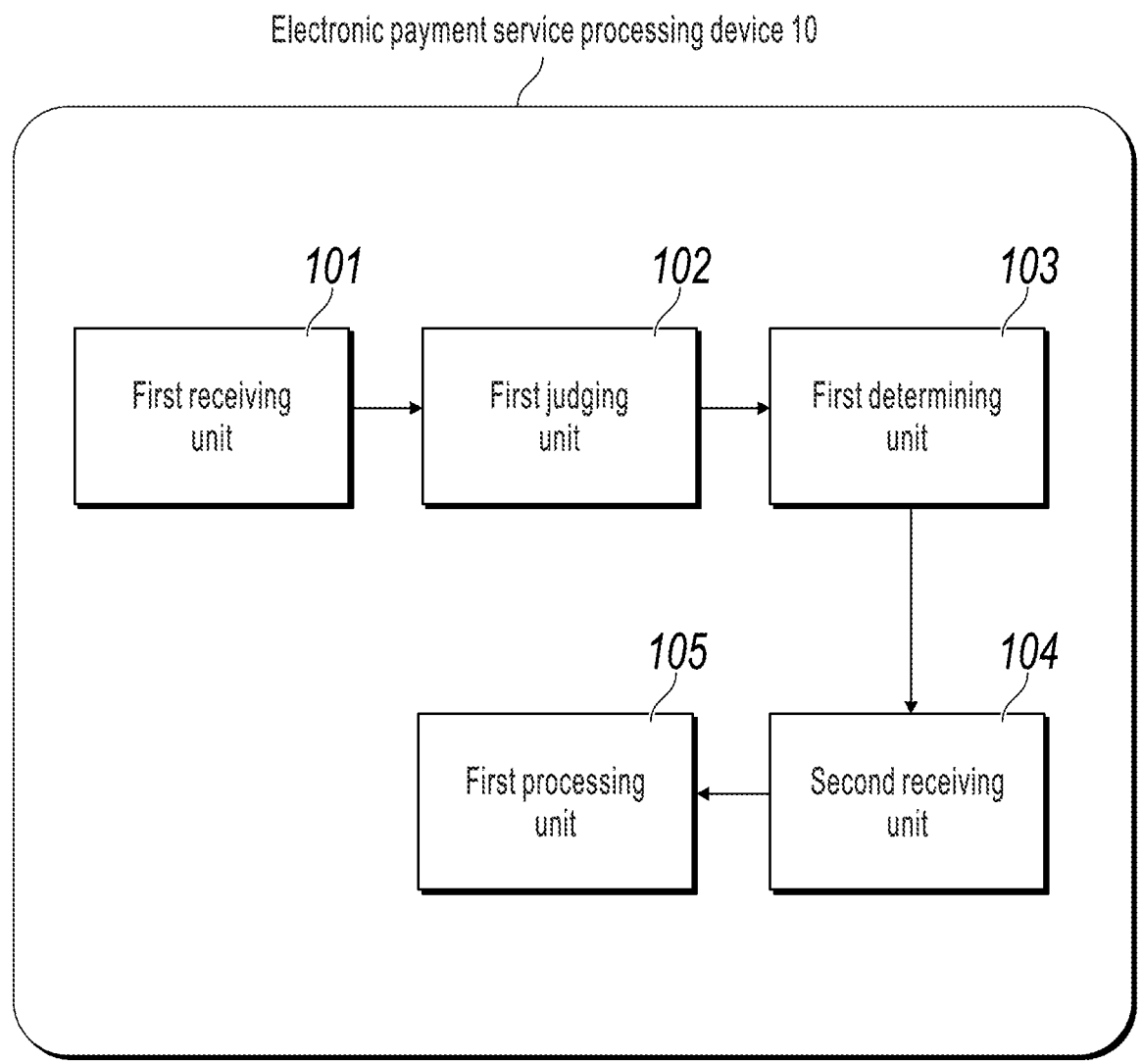
FIG. 8 is a schematic structural diagram illustrating an electronic payment service processing device, according to Implementation 10 of the present application.

Based on the same inventive concept as Implementation 1, Implementation 10 provides an electronic payment service processing device. As shown in FIG. 8, the device 10 includes a first receiving unit 101, a first judging unit 102, a first determining unit 103, a second receiving unit 104, and a first processing unit 105.

The first receiving unit 101 is configured to receive a first service information set needed for electronic payment service processing, to perform the electronic payment service processing.

The first judging unit 102 is configured to determine whether the electronic payment service processing fails, and if yes, trigger the first determining unit 103.

The first determining unit 103 is configured to: when the electronic payment service processing fails, determine, based on a type of the electronic payment service processing failure, whether to generate a re-payment entrance. The re-payment entrance can be associated with a second service information set, and the second service information set is formed after a corresponding element in the first service information set that causes the electronic payment service processing failure is adjusted.

The second receiving unit 104 is configured to receive an instruction indicating that the re-payment entrance is triggered.

The first processing unit 105 is configured to perform the electronic payment service processing by using elements in the second service information set and a third service information set. The third service information set is a difference set of the first service information set and the second service information set.

According to the electronic payment service processing device provided in Implementation 10, when the electronic payment service processing performed based on the first service information set fails, the server can generate the re-payment entrance based on the type of the electronic payment service processing failure; receive the second service information set submitted by a user through the re-payment entrance, where the second service information set is formed after the corresponding element in the first service information set that causes the electronic payment service processing failure is adjusted; and perform the electronic payment service processing by using the elements in the second service information set and the third service information set, where the third service information set is the difference set of the first service information set and the second service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 11

Figure 9:
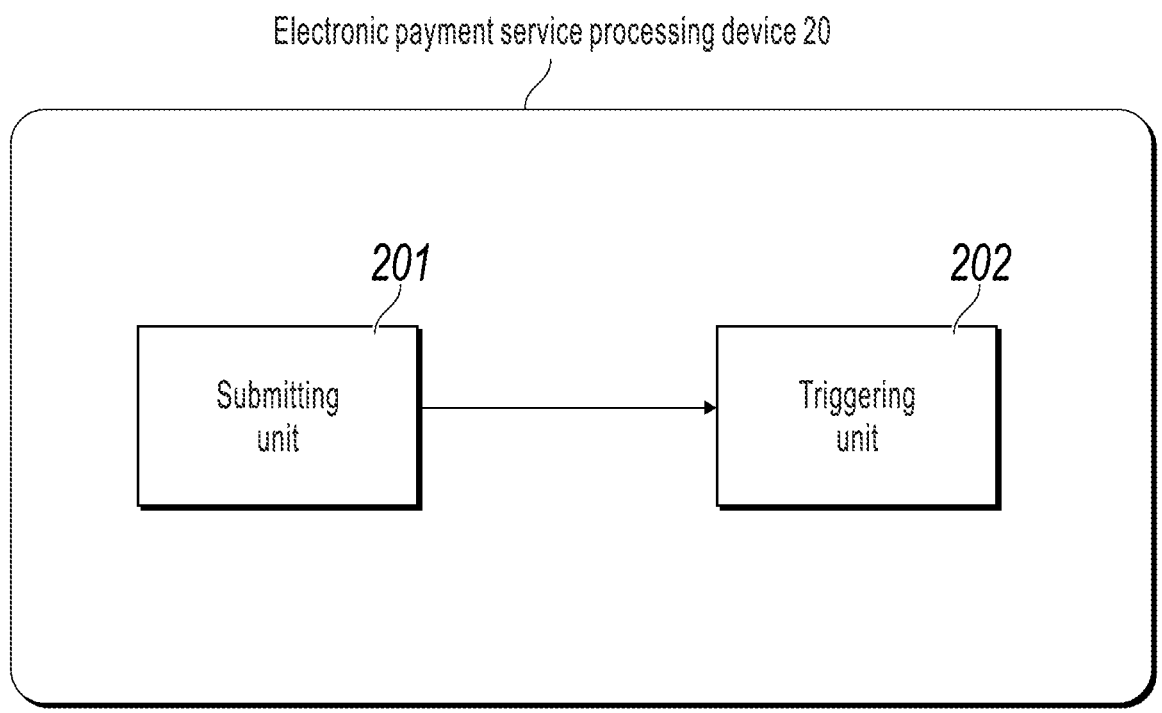
FIG. 9 is a schematic structural diagram illustrating an electronic payment service processing device, according to Implementation 11 of the present application.

Based on the same inventive concept as Implementation 8, Implementation 11 provides an electronic payment service processing device. As shown in FIG. 9, the device 20 includes a submitting unit 201 and a triggering unit 202.

The submitting unit 201 is configured to submit a first service information set needed for electronic payment service processing, so that the electronic payment service processing is performed.

The triggering unit 202 is configured to trigger a re-payment entrance when the electronic payment service processing fails, so that a server performs electronic payment service processing by using elements in a second service information set and a third service information set. The re-payment entrance is generated by the server based on a type of the electronic payment service processing failure and can be associated with the second service information set. The second service information set is formed after the server adjusts a corresponding element in the first service information set that causes the electronic payment service processing failure. The third service information set is a difference set of the first service information set and the second service information set.

According to the electronic payment service processing device provided in Implementation 11, when the electronic payment service processing fails, the user submits the second service information set through the re-payment entrance, so that the server performs the service processing by using the second service information set and the third service information set. The second information set is formed after the server adjusts the corresponding element in the first service information set that causes the electronic payment service processing failure. The third service information set is the difference set of the first service information set and the second service information set. Therefore, the following problem in the existing technology is resolved: When electronic payment service processing fails, before the electronic payment service processing is performed again, the user needs to resubmit all service information needed for the electronic payment service processing. As such, user experience is improved.

Implementation 12

Figure 10:
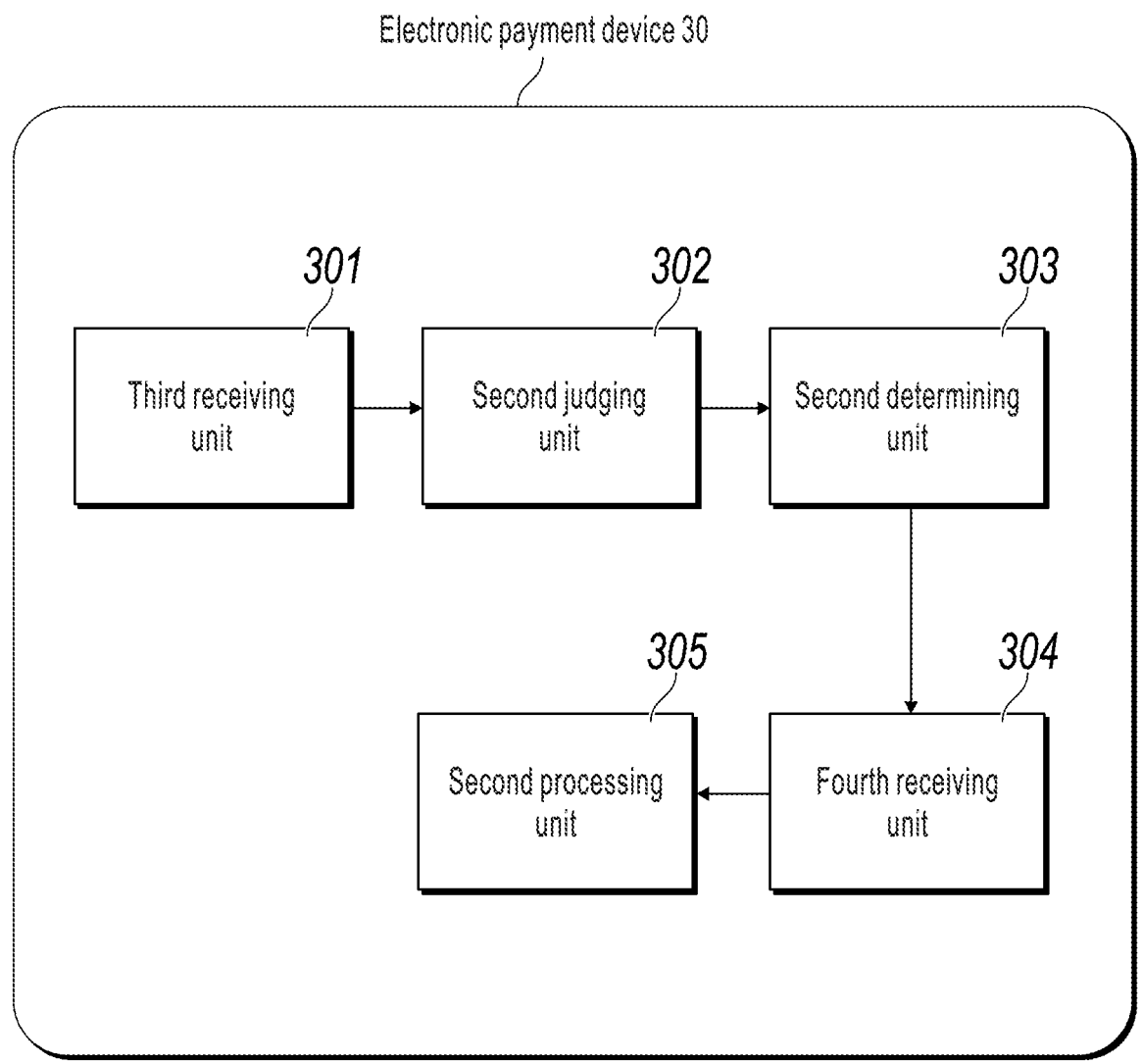
FIG. 10 is a schematic structural diagram illustrating an electronic payment device, according to Implementation 12 of the present application.

Based on the same inventive concept as Implementation 9, Implementation 12 provides an electronic payment device. As shown in FIG. 10, the device 30 includes a third receiving unit 301, a second judging unit 302, a second determining unit 303, a fourth receiving unit 304, and a second processing unit 305.

The third receiving unit 301 is configured to receive a payment element information set needed for electronic payment, to perform the electronic payment.

The second judging unit 302 is configured to determine whether the electronic payment fails, and if yes, trigger the second determining unit.

The second determining unit 303 is configured to determine, based on a type of the electronic payment failure, whether to generate a re-payment entrance. The re-payment entrance can be associated with a new payment element formed after a payment element that causes the electronic payment failure is adjusted.

The fourth receiving unit 304 is configured to receive an instruction indicating that the re-payment entrance is triggered.

The second processing unit 305 is configured to implement re-payment by using the new payment element and an element in the payment element information set other than the payment element that causes the electronic payment failure.

According to the electronic payment device provided in Implementation 12, other effects in addition to the effect described in Implementation 9 can be further achieved in combination with a specific device in actual application. For example, when the device is integrated with a mobile phone, units with similar functions can be integrated to save processing resources on the mobile phone.

A person skilled in the art should understand that the implementations of the present application can be provided as a method, a system, or a computer program product. Therefore, the present application can use hardware only implementations, software only implementations, or implementations with a combination of software and hardware. Moreover, the present application can use a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each process, and/or each block in the flowcharts, and/or the block diagrams and a combination of a process, and/or a block in the flowcharts, and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate a device for implementing a certain function in one or more processes in the flowcharts and/or in one or more blocks in the block diagrams.

These computer program instructions can be stored in a computer readable memory that can instruct the computer or any other programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more central processing units (CPUs), an input/output interface, a network interface, and a memory.

The memory can take a form of a volatile memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change memory (PCM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device, or any other non-transmission media that can be configured to store information that a computing device can access. As defined in the present specification, the computer readable medium does not include a transitory medium such as a modulated data signal and carrier.

Moreover, it is worthwhile to note that the terms "include", "comprise", or their any other variants are intended to cover a non-exclusive inclusion, so that a process, a method, an article, or a device that includes a list of elements not only includes those elements but also includes other elements that are not expressly listed; or further includes elements inherent to such a process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use hardware only implementations, software only implementations, or implementations with a combination of software and hardware. Moreover, the present application can use a computer program product that is implemented on one or more computer-usable storage media (including but not limited to a disk memory, a CD-ROM, an optical memory, etc.) that include computer-usable program code.

The above-mentioned descriptions are merely the implementations of the present application, but are not intended to limit the present application. A person skilled in the art can make various modifications and variations to the present application. Any modification, equivalent replacement, or improvement made without departing from the spirit and principle of the present application shall fall within the scope of the claims of the present application.

Figure 11:
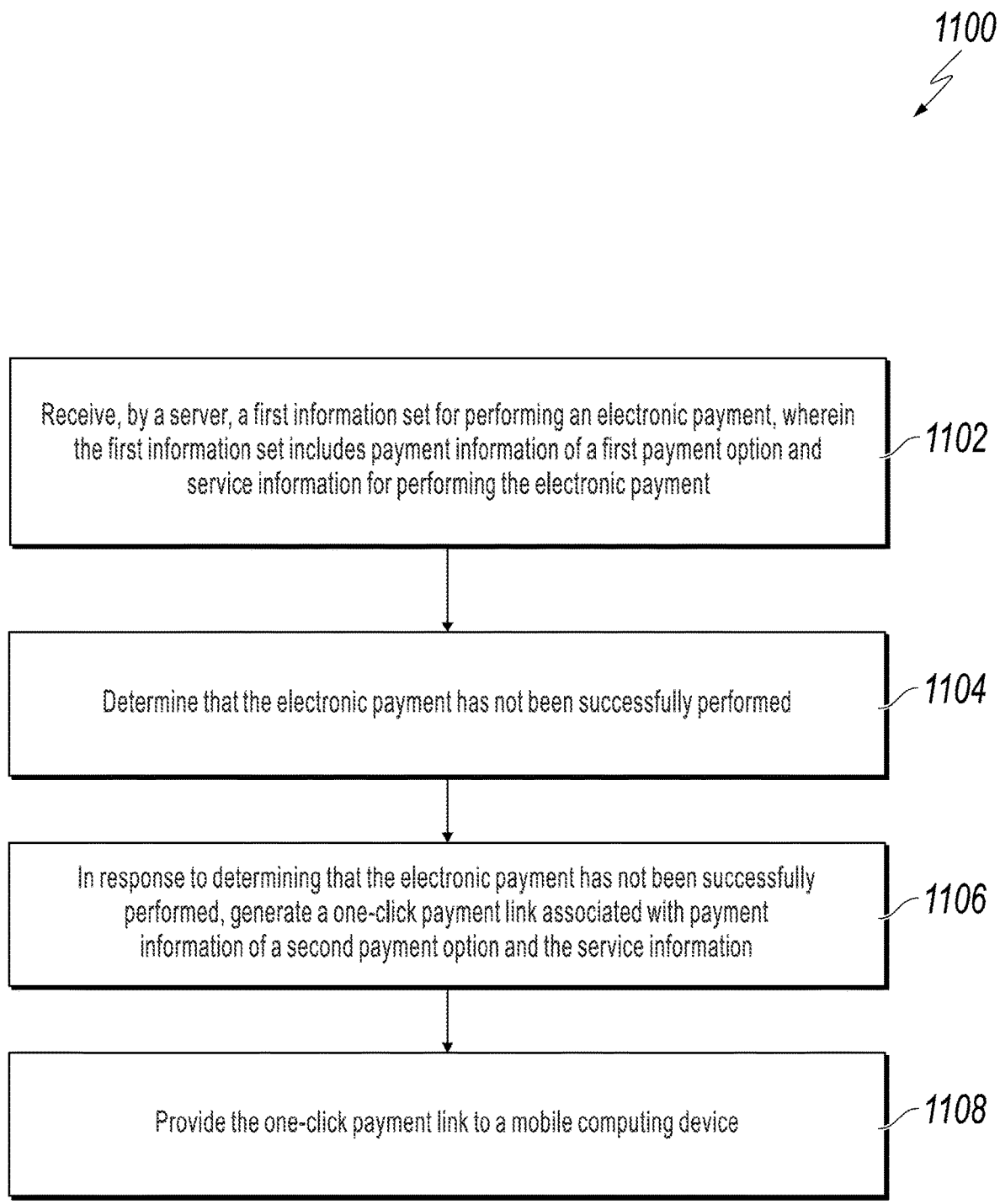
FIG. 11 is a flowchart illustrating an example of a computer-implemented method for processing electronic payment, according to an implementation of the present disclosure.

FIG. 11 is a flowchart illustrating an example of a computer-implemented method 1100 for processing electronic payment, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a first information set for performing an electronic payment is received by a server, wherein the first information set includes payment information of a first payment option and service information for performing the electronic payment. In some implementations, the payment information can include at least one of a payment card number, a payment password, a payment amount, or a payment verification code. The service information can include at least one of a user payment agreement or a payment timing indicator. The payment timing indicator can include a timestamp for recording a time that the one-click payment link is generated and a predetermined payment time period. A difference between the recorded time of the timestamp and a current time can be determined. If the difference is greater than the predetermined time period, the one-click payment attempt can be rejected because of payment timeout. From 1102, method 1100 proceeds to 1104.

At 1104, a determination is made that the electronic payment has not been successfully performed. In some cases, a reason of failure may be determined. For example, the reason of failure can include not enough balance, payment verification failure, payment timeout, server error, or network error. From 1104, method 1100 proceeds to 1106.

At 1106, a one-click payment link associated with payment information of a second payment option and the service information is generated. In some implementations, generating a one-click payment link further includes generating a payment certificate and associating the payment certificate with the payment information of the second payment option and the service information. In some implementations, the payment certificate is a unique random number. The payment certificate can be an identifier generated by a globally unique identifier (GUID) or generated based on a progressive method. In some implementations, the one-click payment link is triggered by performing an operation on the mobile computing device, the operation can include at least one of a selecting operation, a clicking operation, a hand gesture, a shaking operation, or a biometric recognition operation. When an electronic payment fails, a server can send the one-click payment link and the unique random number to the user who made the electronic payment. After the user triggers the one-click payment link, the payment certificate can be returned to the server. As such, the association between the payment certificate and the payment information of the second option and the service information can be associated. Afterwards, the server can execute the payment based on the payment information of the second option and the service information.

At 1108, the one-click payment link is provided to a mobile computing device.

Embodiments of the subject matter described in this specification can be implemented so as to realize particular advantages or technical effects. For example, implementations of the subject matter permit a server to quickly provide a user an alternative payment channel if a previous electronic payment fails, such that the user can easily retry a payment (for example, through a one-click payment button) without entering a password or adjusting the payment method based on error messages. The server can analyze the reason of the payment failure, such as payment link error caused by system software or hardware, or insufficient account balance, and recommend solution to retry the payment. As such, electronic payments can be efficiently made after temporary failure, user operations to fix payments can be simplified, and user experience can be improved.

The described methodology permits enhancement of transaction/data security of various mobile computing device. Participants in the electronic payment process do not need to perform complex operations on payment accounts but can retry failed payments through a simple, standardized step. As such, a payment service provider can have more control on security of the payment process.

The described methodology can ensure the efficient usage of computer resources (for example, processing cycles, network bandwidth, and memory usage), through the efficient re-payment link generation and execution process. At least these actions can minimize or prevent waste of available computer and network resources with respect to multiple parties in mobile transactions by reducing bandwidth occupancy between the mobile computing device and the server. Instead of the mobile computing device needing to verify data and make adjustments with additional communication or transactions with the server. The re-payment can be more quickly and securely made through simpler user-server interactions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, by a server and from a mobile computing device associated with a user, a first information set for performing an electronic payment, wherein the first information set includes payment information of a first payment option and service information for performing the electronic payment, wherein the service information comprises a password that is used to verify an identity of the user when the electronic payment is performed;
determining that the electronic payment has not been successfully performed by the mobile computing device;
determining that the service information does not cause a failure of the electronic payment;
storing, by the server as stored service information, the service information, wherein the stored service information allows the user to retry the electronic payment without entering the password;
generating, by the server, a one-click payment link, wherein generating the one-click payment link comprises generating a payment certificate and associating the payment certificate with payment information of a second payment option and the service information, wherein the payment certificate is associated with a timestamp for recording a time when the one-click payment link is generated, and wherein the one-click payment link comprises a web page hyperlink;
providing, by the server, the one-click payment link to the mobile computing device;

in response to determining that the one-click payment link is triggered by the mobile computing device, obtaining, by the server, the stored service information;

determining, by the server, a difference between the timestamp and a current time and rejecting a one-click payment attempt if the difference is greater than a predetermined payment time period; and in response to determining that the difference between the timestamp and the current time is equal to or less than the predetermined payment time period, performing, by the server, the electronic payment based on the payment information of the second payment option and the stored service information.

2. The computer-implemented method of claim 1, wherein associating the payment certificate with payment information of the second payment option and the service information comprises adding the payment certificate to payment information of the second payment option.

3. The computer-implemented method of claim 1, wherein the payment certificate is a unique random number.

4. The computer-implemented method of claim 1, wherein the payment information includes at least one of a payment card number, a payment password, a payment amount, or a payment verification code.

5. The computer-implemented method of claim 1, wherein the service information further includes a user payment agreement.

6. The computer-implemented method of claim 1, wherein determining that the service information does not cause the failure of the electronic payment comprises determining that the failure of the electronic payment is caused by one or more of insufficient funds, a server error, or a network error.

7. The computer-implemented method of claim 1, wherein the one-click payment link is triggered by performing an operation on the mobile computing device, the operation includes at least one of a selecting operation, a clicking operation, a hand gesture, a shaking operation, or a biometric recognition operation.

8. A non-transitory, computer-readable medium storing one or more instructions executable by a computer system to perform operations comprising:

receiving, by a server and from a mobile computing device associated with a user, a first information set for performing an electronic payment, wherein the first information set includes payment information of a first payment option and service information for performing the electronic payment, wherein the service information comprises a password that is used to verify an identity of the user when the electronic payment is performed;

determining that the electronic payment has not been successfully performed by the mobile computing device;

determining that the service information does not cause a failure of the electronic payment;

storing, by the server as stored service information, the service information, wherein the stored service information allows the user to retry the electronic payment without entering the password;

generating, by the server, a one-click payment link, wherein generating the one-click payment link comprises generating a payment certificate and associating the payment certificate with payment information of a second payment option and the service information, wherein the payment certificate is associated with a timestamp for recording a time when the one-click payment link is generated, and wherein the one-click payment link comprises a web page hyperlink;

providing, by the server, the one-click payment link to the mobile computing device;

in response to determining that the one-click payment link is triggered by the mobile computing device, obtaining, by the server, the stored service information;

determining, by the server, a difference between the timestamp and a current time and rejecting a one-click payment attempt if the difference is greater than a predetermined payment time period; and in response to determining that the difference between the timestamp and the current time is equal to or less than the predetermined payment time period, performing, by the server, the electronic payment based on the payment information of the second payment option and the stored service information.

9. The non-transitory, computer-readable medium of claim 8, wherein associating the payment certificate with payment information of the second payment option and the service information comprises adding the payment certificate to payment information of the second payment option.

10. The non-transitory, computer-readable medium of claim 8, wherein the payment certificate is a unique random number.

11. The non-transitory, computer-readable medium of claim 8, wherein the payment information includes at least one of a payment card number, a payment password, a payment amount, or a payment verification code.

12. The non-transitory, computer-readable medium of claim 8, wherein the service information further includes a user payment agreement.

13. The non-transitory, computer-readable medium of claim 8, wherein determining that the service information does not cause the failure of the electronic payment comprises determining that the failure of the electronic payment is caused by one or more of insufficient funds, a server error, or a network error.

14. The non-transitory, computer-readable medium of claim 8, wherein the one-click payment link is triggered by performing an operation on the mobile computing device, the operation includes at least one of a selecting operation, a clicking operation, a hand gesture, a shaking operation, or a biometric recognition operation.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a server and from a mobile computing device associated with a user, a first information set for performing an electronic payment, wherein the first information set includes payment information of a first payment option and service information for performing the electronic payment, wherein the service information comprises a password that is used to verify an identity of the user when the electronic payment is performed;

determining that the electronic payment has not been successfully performed by the mobile computing device;

determining that the service information does not cause a failure of the electronic payment;

storing, by the server as stored service information, the service information, wherein the stored service information allows the user to retry the electronic payment without entering the password;

generating, by the server, a one-click payment link, wherein generating the one-click payment link comprises generating a payment certificate and associating the payment certificate with payment information of a second payment option and the service information, wherein the payment certificate is associated with a timestamp for recording a time when the one-click payment link is generated, and wherein the one-click payment link comprises a web page hyperlink;

providing, by the server, the one-click payment link to the mobile computing device;

in response to determining that the one-click payment link is triggered by the mobile computing device, obtaining, by the server, the stored service information;

determining, by the server, a difference between the timestamp and a current time and rejecting a one-click payment attempt if the difference is greater than a predetermined payment time period; and in response to determining that the difference between the timestamp and the current time is equal to or less than the predetermined payment time period, performing, by the server, the electronic payment based on the payment information of the second payment option and the stored service information.

16. The computer-implemented system of claim 15, wherein associating the payment certificate with payment information of the second payment option and the service information comprises adding the payment certificate to payment information of the second payment option.

17. The computer-implemented system of claim 15, wherein the payment certificate is a unique random number.

18. The computer-implemented system of claim 15, wherein the payment information includes at least one of a payment card number, a payment password, a payment amount, or a payment verification code.

19. The computer-implemented system of claim 15, wherein the service information further includes a user payment agreement.

20. The computer-implemented system of claim 15, wherein determining that the service information does not cause the failure of the electronic payment comprises determining that the failure of the electronic payment is caused by one or more of insufficient funds, a server error, or a network error.

21. The computer-implemented method of claim 1, wherein the payment certificate is associated with status information for recording whether the stored service information has been obtained based on triggering of the one-click payment link, and wherein the computer-implemented method further comprises:

in response to determining that the difference between the timestamp and the current time is equal to or less than the predetermined payment time period, obtaining the status information based on the payment certificate;

determining that the status information indicates that the stored service information has not been obtained based on the triggering of the one-click payment link; and after performing the electronic payment based on the payment information of the second payment option and the stored service information, updating the status information to indicate that the stored service information has been obtained based on the triggering of the one-click payment link.

* * * * *